United States Patent
Haner et al.

(10) Patent No.: US 9,137,330 B2
(45) Date of Patent: Sep. 15, 2015

(54) METHOD OF DYNAMICALLY ADJUSTING QUALITY OF SERVICE (QOS) TARGETS

(75) Inventors: Mark Haner, Westfield, NJ (US); Danielle Hinton, Cambridge, MA (US); Thierry Etienne Klein, Fanwood, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1868 days.

(21) Appl. No.: 11/080,853

(22) Filed: Mar. 16, 2005

(65) Prior Publication Data

US 2006/0212594 A1   Sep. 21, 2006

(51) Int. Cl.
*G06F 15/16* (2006.01)
*H04L 29/08* (2006.01)
*H04L 12/851* (2013.01)

(52) U.S. Cl.
CPC .............. *H04L 67/322* (2013.01); *H04L 47/24* (2013.01)

(58) Field of Classification Search
CPC .................................................... H04L 67/322
USPC ................................ 709/232, 226; 455/452.1
See application file for complete search history.

(56) References Cited

U.S. PATENT DOCUMENTS

| | | | | |
|---|---|---|---|---|
| 5,633,859 A * | 5/1997 | Jain et al. | | 370/234 |
| 5,737,313 A * | 4/1998 | Kolarov et al. | | 370/234 |
| 5,912,884 A * | 6/1999 | Park et al. | | 370/331 |
| 5,983,278 A * | 11/1999 | Chong et al. | | 709/235 |
| 6,023,453 A * | 2/2000 | Ruutu et al. | | 370/229 |
| 6,115,390 A * | 9/2000 | Chuah | | 370/443 |
| 6,154,445 A * | 11/2000 | Farris et al. | | 370/237 |
| 6,490,249 B1 * | 12/2002 | Aboul-Magd et al. | | 370/232 |
| 6,631,118 B1 * | 10/2003 | Jones | | 370/252 |
| 6,822,940 B1 * | 11/2004 | Zavalkovsky et al. | | 370/237 |
| 7,266,612 B1 * | 9/2007 | Heyman | | 709/232 |
| 7,349,340 B2 * | 3/2008 | Sahai et al. | | 370/235 |
| 7,430,187 B2 * | 9/2008 | Holt et al. | | 370/329 |
| 2002/0091802 A1 * | 7/2002 | Paul et al. | | 709/220 |
| 2002/0181410 A1 * | 12/2002 | Bae et al. | | 370/252 |
| 2003/0142623 A1 * | 7/2003 | Bernhard et al. | | 370/229 |
| 2004/0242256 A1 * | 12/2004 | Xiao et al. | | 455/522 |
| 2005/0160429 A1 * | 7/2005 | Hameleers et al. | | 718/105 |
| 2005/0204054 A1 * | 9/2005 | Wang et al. | | 709/232 |
| 2005/0243752 A1 * | 11/2005 | Brueck et al. | | 370/317 |
| 2006/0146874 A1 * | 7/2006 | Yuan et al. | | 370/468 |
| 2006/0277280 A1 * | 12/2006 | Craggs | | 709/220 |

OTHER PUBLICATIONS

Sheng-Tzong Cheng et al, A Study of Self-Adjusting Quality of Service Control Schemes, 1998, IEEE Computer Society Press, p. 1623-1628.*

Zhanjun, Zhang et al, The Guarantee of QOS for Wireless Multimedia Streams based on Adaptive Session, 2000, IEEE Computer Society Press, p. 283-287.*

(Continued)

*Primary Examiner* — Guang Li

(74) *Attorney, Agent, or Firm* — Harness, Dickey and Pierce, P.L.C.

(57) ABSTRACT

A method of dynamically adjusting quality of service targets for applications and/or subscribers of wireless communication, by reducing or increasing quality of service targets for a group of applications based on overload or under load detection, in order to ensure that actually achieved quality of service levels are adequate, especially when supporting emergency service users.

14 Claims, 3 Drawing Sheets

(56) References Cited

OTHER PUBLICATIONS

Kumaran, Krishnan et al., "*Uplink Scheduling in CDMA Packet-Data Systems*", IEEE, pp. 292-300, 2003.

Borst, Sem, "*User-Level Performance of Channel-Aware Scheduling Algorithms in Wireless Data Networks*", IEEE, pp. 321-331, 2003.

Joshi, Niranjan et al., "*Downlink Scheduling in CDMA Data Networks*", MOBICOM, Boston, MA USA, pp. 179-190, 2000.

\* cited by examiner

METHOD OF DYNAMICALLY ADJUSTING QUALITY OF SERVICE (QOS) TARGETS

BACKGROUND OF THE INVENTION

The present invention relates to the field of wireless communication.

Commercial wireless network providers recognize that different subscribers may desire different levels of service, and may even desire different levels of service for different applications (e.g., voice, streaming video, email, web-browsing, etc.). For example, a subscriber may be willing to pay a higher subscription fee for a higher level of data throughput while surfing the Internet or downloading email. As another example, a subscriber may be willing to pay for a higher email download speed, but does not want to pay extra for higher internet web-page download speeds. To entice subscribers to pay higher prices for higher levels or quality of service, network providers need to be able to guarantee those higher levels of service.

Similarly, in the government sector, a government owned wireless network may be provided. The government network may be shared by emergency services such as police, fire and rescue as well as civil and municipal services such as schools, libraries, traffic information providers, home inspectors, non-emergency police and fire communication, etc. As will be appreciated, service and/or higher quality of service needs to be guaranteed for emergency services than may be needed for civil and municipal services.

SUMMARY OF THE INVENTION

Recognizing that a limited amount of frequency spectrum is available for wireless communication, the present invention provides a method for dynamically changing quality of service (QoS) targets.

For example, recognizing that a commercial network provider more highly values subscribers paying higher amounts because of promised higher quality of service than lower paying customers, the commercial network provider may be willing to reduce QoS targets of lower paying customers to maintain the QoS targets of higher paying customers.

Similarly, recognizing that emergency services take priority over civil and municipal services, the government wireless network will, when necessary, want to reduce the QoS targets of civil and municipal services to maintain the QoS targets of emergency services.

In accordance with one embodiment of the present invention, the applications of a subscriber are assigned a priority. For example, a subscriber to a commercial wireless network may subscribe to different qualities of service for different applications. For example, the commercial service provider may offer different prices for different ranges of quality of service for each application. A subscriber subscribes to a particular range for each application as the quality of service for that application. Based on the quality of service subscribed to for each application, the subscriber is assigned a priority with respect to that application. Applications of similar priority may then be grouped into classes.

Similarly, in accordance with another embodiment of the present invention, the priority class assigned to an application and/or subscriber (also referred to as a user) may be dependent on the service with which the application and/or user is associated. For example, applications and/or users associated with emergency services are assigned a higher priority class than applications and/or users associated with civil and municipal services.

In one embodiment, quality of service targets for a first group of applications are reduced based on an overload detection. For example, in one embodiment, the quality of service targets for the first group of applications are reduced in proportion to an amount of overload detected.

In another embodiment, the quality of service targets for the first group of applications are reduced to respective required quality of service values, which may be respective minimum levels of service required for the applications to function properly, respective lower levels allowed pursuant to the user's pricing plan, or etc.

In yet another embodiment, the quality of service targets for the first group of applications are reduced to respective required quality of service values if a detected overload is greater than a first threshold, and the quality of service targets for a second group of applications belonging to the lower priority class of applications are reduced based on an amount of overload detected if the detected overload is less than the first threshold.

Another embodiment calls for dropping a third group of applications if the detected overload is greater than a second overload threshold, where the second overload threshold is greater than the first overload threshold. Here, the quality of service targets for the first group of applications are reduced to respective required quality of service values if the detected overload is greater than the first threshold and less than the second threshold.

In a further embodiment, a group of applications is dropped if overload is detected and none of the applications have quality of service targets that are greater than respective required quality of service values.

In the above embodiment, the reducing or dropping may take place with respect to a lower priority class of applications. However, if the lower priority applications have been dropped from the system, or if the quality of service targets have already been set to their minimum required values, then the reducing and/or dropping may then take place with respect to a higher priority class of applications.

An additional embodiment teaches increasing quality of service targets for a group of applications if no overload is detected. Here, the applications in the group each have quality of service targets less than respective preferred quality of service values. The increasing may be performed for a higher priority class of applications until respective preferred quality of service values are reached, and then the increasing may be performed for a lower priority class of applications.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

Figure 1:
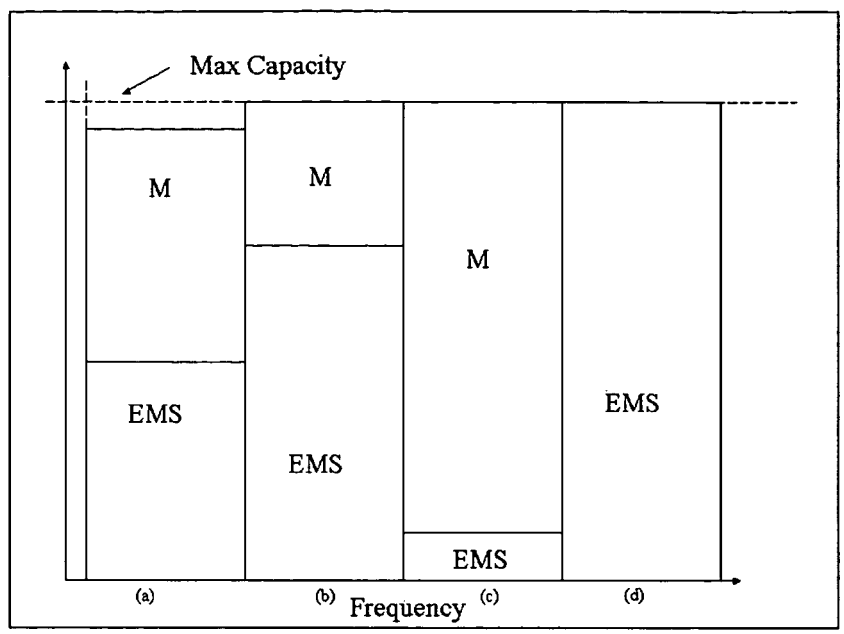
FIG. 1 illustrates an example of frequency portioning between two different levels of service.

A commercial wireless network service provider may provide different qualities of service on a per subscriber (also referred to as a user) basis, on a per application basis, or a combination of both. Examples of applications are voice communication, video streaming, web-browsing, email (uploading or sending, and downloading or receiving), etc. Different quality of service parameters indicate the quality of service being provided for a given application. Examples of quality of service parameters include frame error rate, bit error rate, minimum throughput, delay of individual received frames, delay jitter between consecutive received frames, packet error rates, rise over thermal, etc. all of which are well-known parameters in the wireless communication industry. As will be appreciated, this list is by no means exhaustive.

Generally speaking quality of service (QoS) parameters may be thought of in several ways:

Preferred QoS, which may be the ideal level of service for a given application, a highest level of service allowed pursuant to the user's pricing plan, or etc.;

Required QoS, which may be the minimum level of service required for the application to function properly, a lowest level of service allowed pursuant to the user's pricing plan, or etc.; and Target QoS, which is the level of service that the resource allocation algorithms aim to achieve. For example, the target QoS may be set to the required QoS or to some level between the required QoS and the preferred QoS.

In general, the target QoS is within the range between the required QoS and the preferred QoS. If the preferred QoS is larger than the required QoS, the application is deemed to have soft QoS constraints. This means that the content delivery of the application can be adjusted to the channel conditions experienced by the terminal, the network loading or the availability of different access technologies without impeding on the normal operations of the application. For example, a video application can transmit only black and white images and adjust the color selection and the image resolution. On the other hand it is possible that the preferred QoS is equal to the required QoS in which case the application is not adaptive and is deemed to have hard QoS constraints.

The commercial wireless network provider may provide different pricing plans whereby the subscriber pays an incrementally higher price for higher levels of service for each application. For example, the network service provider may offer three different levels of throughput in association with video streaming. As an illustrative example, the cheapest level may provide throughputs in the range of 9.6 kps to 38.4 kps (for this range, for example, 9.6 kps is the required QoS and 38.4 kps is the preferred QoS), the next more costly level may provide throughputs in the range of 38.4 kps to 76.8 kps, and the most costly level may provide throughputs in the range of 76.8 kps to 153.6 kps. Additionally, or alternatively, instead of providing incremental pricing per application, the wireless network service provider may provide differently priced packages, wherein each package is associated with particular quality of service guarantees for a variety of applications. Namely, high priced packages will offer higher quality of service guarantees (e.g., a higher range of guaranteed throughput) than lower priced packages.

Depending on the subscribed to quality of service per application, the application is assigned to a priority class. For example, an application having a higher throughput quality of service guarantee may be assigned to a higher priority class of applications than an application having a lower throughput quality of service guarantee. As will be appreciated, two applications run by the same subscriber may, therefore, belong to different priority classes; and different subscribers running the same application may have their respect application belonging to different priority classes. Likewise, different subscribers running the same or different applications may have those applications assigned to the same priority class. It should be understood, that the applications or users in a priority class need not have the same priority. Also, within each class, applications and/or users may be organized into subclasses. Examples are discussed below where applications or users in the same priority class may have different priorities.

As a further alternative, division of applications into different priority classes may be made on a subscriber basis instead of an application by application basis. For example, a subscriber subscribing to a higher priced package may be assigned to higher priority class, or have his applications assigned to a higher priority class, than a subscriber subscribing to a lower priced package.

Dividing applications and/or users into priority classes also applies to government wireless networks. For example, the applications of emergency service users (e.g., police, fire, rescue, etc.) may be assigned to a high priority class than applications of civil and municipal service users (e.g., library, school, building inspectors, etc.). It will be appreciated that, in a government wireless network, applications or users are assigned to different priority classes not based on having paid a higher price for a higher quality of service. Instead, applications and/or users are assigned different priority classes based on the perceived importance of the function they are performing. Namely, firemen responding to a house fire are deemed to have a higher priority than a librarian communicating with a local school. Similarly, a fireman responding to a house fire may be deemed to have a higher priority than a fireman, in a non-emergency situation.

As a few more examples, consider that video-streaming applications may be deemed less necessary to responding to a fire than the voice communication applications. The opposite may be true in other situations. Also, as has been mentioned, priority may be based on the user. For example, the fire chief coordinating the response to a fire may have his applications or a chosen set of applications assigned to a higher priority class than the other firemen responding to the fire. Alternatively, the fire chief may be in the same priority class as the other EMS services, but have a higher priority within that class.

As will be appreciated from the above description, assignment to a priority class may be predetermined or preset. Here, the priorities assigned may be stored and managed as part of a subscriber's profile and sent to a base station or mobile switching center serving the subscriber. Alternatively, priority class assignments may be flexibly changed. For example, flexible change may be performed by a system operator at the mobile switching center such as in the case of the fire emergency example above.

Regardless of the method of assignment, or the flexibility with which that assignment may be changed, the method of dynamically changing QoS targets based on that assignment is applicable. For ease of description, the method of dynamically changing QoS targets will be described for the simple case of two priority classes.

For example, assume the case where the higher priority class includes the applications of emergency service users and the lower priority class includes the applications of civil and municipal service users. Further assume, as shown in FIG. 1, that the frequency spectrum has been partitioned into several channels or carriers (a), (b), (c) and (d). As further shown, the channels or carriers may be divided and partially allocated to emergency services (EMS services), and civil and municipal services (M services). For example, a carrier may be partially allotted by assigning a subset of OFDM tones, channelization codes, slots or portions of a slot, CDMA codes, etc.

Initially all the applications have their QoS targets set to the preferred values. If the resource allocation algorithm is not constrained and the system is not overloaded, the actually achieved performance exceeds that specified by the target QoS. However, depending on the needs of the EMS services, the system may become overloaded and the QoS targets can no longer be satisfied. Inline with the higher priority of the EMS services over the M services, the QoS targets of the M services are dynamically changed and the radio resources allocated to the M services are thereby reduced. This has the desired affect that the air interface resource allocation algorithm is less constrained by the M services and can dedicate more of its resources (in terms of the power and rate allocation, the number of scheduled time slots, the available CDMA codes, OFDM tones, etc.) to the EMS services in the network, thereby ensuring that the EMS QoS target performances are achieved.

Figure 2:
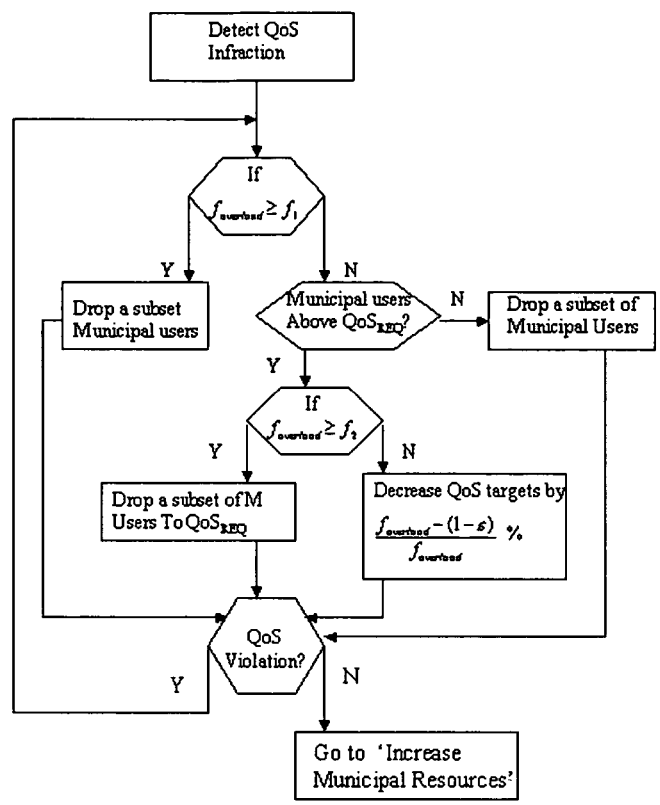
FIG. 2 illustrates a flow chart of dynamically changing quality of service targets according to an embodiment of the present invention.

FIG. 2 illustrates a flow chart of an embodiment for dynamically changing QoS targets of M services when the QoS targets of either the EMS services or the M services are not being satisfied. It will be appreciated that the method, of which FIG. 2 is an example, may be run at a network control node such as a mobile switching center (MSC), a radio network controller (RNC), a base station controller, etc. More specifically, a QoS broker may be deployed in the network control node to conduct communication of the QoS change between the network and the application involved, as well as conduct cross-layer information transfer between the QoS Broker (e.g., implemented at the Medium Access Control (MAC) layer) and the application server.

As shown, the embodiment of FIG. 2 is triggered in step S10 if it is determined that either the EMS services or the M services have incurred a QoS infraction; namely, that system overload has been detected. Overload may be detected if the achieved QoS of an application as indicated by a performance metric falls below a target QoS. Of course, additional factors such as available power, number of codes and channel elements used, etc., may also be included in this determination.

In one embodiment, a normalized performance metric $f_{i,j}$ for each QoS parameter j of an application i that captures the ratio of the achieved quality of service (QoS) performance with respect to the target QoS is determined. The application i may have more than one quality of service parameter. For example, assume an application has the QoS parameters of throughput, delay and packet loss. Then, the application i would have three normalized performance metrics $f_{i,1}$, $f_{i,2}$, and $f_{i,3}$ for throughput, delay, and packet loss, respectively, as shown below:

$$f_{i,1} = \frac{T_{min}}{T_i} \quad \text{(throughput)}$$

$$f_{i,2} = \frac{D_i}{D_{max}} \quad \text{(delay)}$$

$$f_{i,3} = \frac{P_i}{P_{max}} \quad \text{(packet loss probability)}$$

where $T_i$ is the achieved throughput; $T_{min}$ is the minimum throughput target; $D_i$ and $P_i$ are, respectively, the achieved packet delay (e.g., the maximum measured packet delay, the average packet delay or a percentile of the measured packet delays) and packet loss probability; $D_{max}$ and $P_{max}$ are, respectively, the maximum packet delay and packet loss probability. It will be appreciated that these QoS parameters are merely examples, and that an application may have different QoS parameters. Also, an application may have more or fewer than three QoS parameters.

An advantage of the normalized performance metric definition is that it leads to a dimensionless quantity to capture the QoS performance and allows comparison to QoS targets specified in terms of throughput, delay and packet loss. Alternative definitions would include the difference between the achieved performance and the target QoS performance, relative to the target performance. Note that if an application has multiple QoS targets, different performance metrics may be defined for the same application as in the example above. It is evident from the definition of $f_{i,j}$ that the QoS target performance for application i is achieved if $f_{i,j} \leq 1$. Namely, overload exists for $f_{i,j} > 1$. A system QoS feasibility condition is defined as the condition that the QoS targets are satisfied for all N connected applications (EMS and M services):

$$\text{System } QoS \text{ Feasibilty} \Leftrightarrow \max_{i,j} f_{i,j} \leq 1 - \varepsilon$$

where $\varepsilon$ is a feasibility margin that has been included for additional robustness to small time scale performance fluctuations and measurement errors.

Having detected an overload condition, the amount of overload $f_{overload}$, also called the overload performance metric, is determined. In one embodiment, the amount of overload may be defined as:

$$f_{overload} = \max_{i,j} f_{i,j}$$

In an alternative embodiment, the overload performance metric may be the average overload of those applications that violate their QoS targets.

Next, in step S11, the QoS broker determines if any M service applications exist; namely, if any M services applications are using the spectrum. If so, then processing proceeds to step S12. As shown in FIG. 2, in step S12, the QoS broker determines if $f_{overload} \geq f_{th1}$, where $f_{th1}$ is a first overload threshold corresponding to a highest need for resources. If $f_{overload} \geq f_{th1}$, then in step S14, a group of the M services users, and thus their applications, are dropped from the system and all new municipal service requests are rejected. In one embodiment, given the strict priority of the EMS services over M services, all the M services users are dropped from the system. Alternatively, less than all the M services users may be dropped. For example, the M services users may be divided into different priority subclasses, and all but the highest priority subclass of M services users and/or applications are dropped. As another example, the M service users may have different priorities, and those users below a priority threshold are dropped. Alternatively, a group of M services applications may be dropped such that not all of a M services user's applications are dropped. For example, all applications except voice communication may be dropped. Alternatively, the M services dropped may be selected from a group of M services that are the most resource consuming. The resource consumption of M services may be indicated by the transmit power of the corresponding mobile terminal, the number of CDMA codes, the number of OFDM tones, the fraction of time slots allocated to the corresponding mobile terminal, etc.

Dropping M services users in this fashion frees up spectrum immediately for use by EMS services such that the achieved QoS of the EMS services and the M services applications should rise.

In step S16, the QoS broker determines if the overload condition still exists; namely, is a QoS violation for either EMS services or M services still occurring. If so, processing proceeds back to step S11. In step S11, the QoS broker determines if any M services applications still exist. If so, then processing proceeds to step S12. It will be appreciated that if processing proceeds again to step S14, and less than all the M services users were dropped during the previous iteration, a further subset (all or less than all) of the now existing M services users are dropped. If, however, in step S16 a QoS violation no longer exists, the processing proceeds to the embodiment of FIG. 3 described in detail below.

Returning to step S12, if $f_{overload} < f_{th1}$, then in step S18, the QoS broker determines if any of the M services users' applications have QoS targets above their respective required QoS values. If not, then in step S20, the QoS broker drops a group of M services users in the same manner, and with the same alternatives, as described above with respect to step S14. In one embodiment, however, the number of users dropped in step S20 is less than the number of users that would have been dropped in step S14. After step S20, processing proceeds to step S16.

If in step S18, the QoS broker determines that at least one of the applications of M services users has QoS targets above their respective required QoS values, then in step S22 the QoS broker determines if $f_{overload} \geq f_{th2}$, where $f_{th2}$ is a second threshold, less than the first threshold $f_{th1}$. If so, then the overload is still considered significant enough that quick reclamation of spectrum is required. Consequently, in step S24, the QoS broker drops the QoS targets for a group of M services users, and thus their applications, to their required QoS values to free up the necessary resources to accommodate the EMS services. In one embodiment, given the strict priority of the EMS services over M services, all applications of M service users having a QoS target above their respective required QoS values have their QoS targets dropped to the respective require QoS values. Alternatively, less than all such application may have their QoS targets dropped in this fashion. For example, the M services users and/or the M services applications may be divided into different priority classes, and all but the highest priority class of M services users and/or applications may have their QoS targets dropped to their respective required QoS values. Or, those applications or users below a priority threshold may have their QoS targets dropped to their respective required QoS values. Alternatively, but more complex, a group of M services applications may have their QoS targets dropped such that not all of a M services user's applications have their QoS targets dropped. For example, all applications except voice communication may have their QoS targets dropped to their respective require QoS values. Alternatively, the M services having their QoS targets dropped may be selected from a group of M services that are the most resource consuming. The resource consumption of M services may be indicated by the transmit power of the corresponding mobile terminal, the number of CDMA codes, the number of OFDM tones, the fraction of time slots allocated to the corresponding mobile terminal, etc. After step S24, processing proceeds to step S16.

Returning to step S22, if in step S22 the QoS broker determines the $f_{overload} < f_{th2}$, then the system overload condition results from a small increase in the needs of the EMS services; and therefore, a correspondingly small change in the resource allocation for the M services is expected to return the system to feasibility. In this case, in step S26 the QoS targets of a group of M services users/applications is lowered by a percentage that is proportional to the overload as measured by the performance metric. The reduction is shown by the following expression:

$$\frac{f_{overload} - (1-\varepsilon)}{f_{overload}} \times 100\%$$

In one embodiment, each member (user and/or application) of this group has a QoS target that is greater than its respective required QoS. For example, in one embodiment, the group may include all applications that have a QoS target greater than a respective required QoS. As will be appreciated, however, less than all the applications which have a QoS target greater than a respective required QoS may form the group.

In step S26, the lowering of the QoS targets is bounded by the respective required QoS associated with the QoS target. Namely, in one embodiment of step S26, the QoS targets are not reduced below the respective required QoS. After step S26, processing proceeds to step S16. If a QoS violation still exists, then the amount of overload is determined again as described above with respect to step S10 and processing proceeds to step S11. If in step S11, no M services applications exist, then in step S30, the QoS broker reduces the QoS targets of a group of EMS services applications. Here, the group includes EMS services applications having QoS targets greater than their respect QoS required values. The group may be selected in the same manner as groups from the M services were selected in, for example, step S14. Also, the reduction of the QoS targets for the group of EMS services applications may be performed in the same manners as in step S26 for M services applications. After step S30, processing proceeds to step S16. It will be appreciated that step S30 may incorporate threshold based decisions for reducing a group of EMS services application down to their respective QoS required values in the same manner as described in steps S22, S24 and S26 for M services applications.

Also, while this embodiment of the present invention has been described for the case of two priority classes of application, the methodology may be applied in hierarchical or tiered process to any number of priority classes of applications. Accordingly, the manner in which QoS targets are changed may be managed by managing the priority classes.

Figure 3:
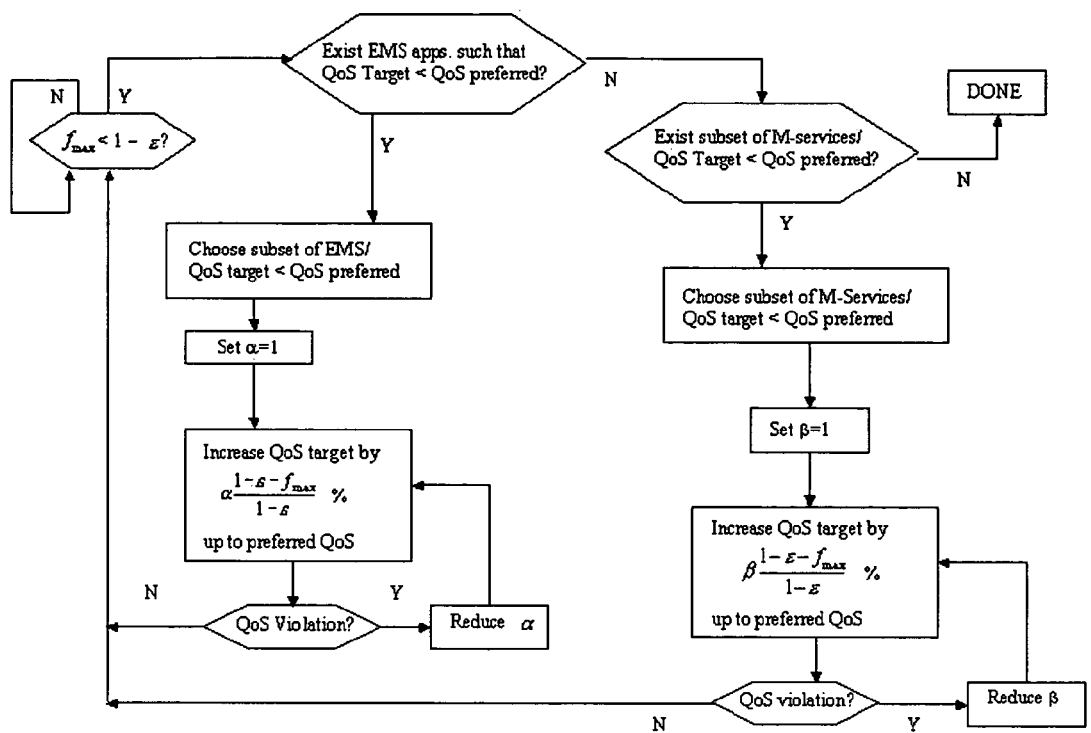
FIG. 3 illustrates a flow chart of dynamically changing quality of service targets according to another embodiment of the present invention.

As indicated in step S16, once the system overload no longer exists such that no QoS violations exist, processing proceeds to the method illustrated in FIG. 3. FIG. 3 illustrates a flow chart of dynamically increasing quality of service targets according to another embodiment of the present invention. The flow chart of FIG. 3 is based on the same example assumption used for the embodiment of FIG. 2. For example, it has been assumed for the purposes of example that applications belong to one of two priority classes—EMS services and M services, where EMS services are a higher priority class than M services.

Processing according to the embodiment of FIG. 3 begins in step S40. Here, the QoS broker determines if there is sufficient under loading of the spectrum to permit an increase in QoS targets. More specifically, the QoS broker determines the maximum performance metric from the EMS and the M services applications, and determines if this maximum performance metric is less than (1-E), where E is a margin to prevent ping-ponging (i.e., switching back and forth) between the QoS target decrease methodology of FIG. 2 and the QoS target increase methodology of FIG. 3. The margin E helps ensure that sufficient resources exist to permit a QoS target increase without causing a QoS violation. In one embodiment, the margin E is greater than the margin e discussed above.

If the maximum performance metric is less than (1-E), the in step S41, the QoS broker determines if any of the existing EMS applications have a target QoS less than their respective preferred QoS. If so, then in step S42, the QoS broker selects a group of EMS applications having their QoS targets less than their respective preferred QoS. For example, in one embodiment, all EMS applications having their QoS targets less than their respective preferred QoS are selected. However, it will be appreciated that fewer than all of the EMS applications having their QoS targets less than their respective preferred QoS may be selected. This group may be selected based on the respective priorities of the applications.

Next, in step S44, a control parameter α is set to 1. Then, in step S46, the QoS targets of the applications in the selected group are increased according to the expression:

$$\alpha \frac{1 - E - f_{max}}{1 - E} \times 100\%$$

As indicated in FIG. 3, in increasing the QoS targets in step S46, the QoS broker does not increase a QoS target beyond its respective preferred QoS.

In subsequent step S48, the QoS broker determines if a QoS violation (a network overload) exists (e.g., the QoS broker determines if the performance metrics for both EMS and M services applications meet the QoS feasibility criteria). If so, then in step S50, the QoS targets are reset to levels prior to step S46 and the control parameter is reduced. For example, the control parameter may be reduced by 10% in step S50. After step S50, processing returns to step S46. If in step S48, no QoS violation exists, then processing returns to step S40. It is checked again whether the system remains under loaded; if this is the case, the same procedure is repeated as outlined above.

Returning to step S41, if the EMS services applications have their target QoSs at their respect preferred QoSs, then in step S52, the QoS broker determines if any of the existing M services applications have a target QoS less than their respective preferred QoS. If not, processing ends; otherwise, in step S54, the QoS broker selects a group of M services applications having QoS targets less than their respective preferred QoS. For example, in one embodiment, all M services applications having QoS targets less than their respective preferred QoS are selected. However, it will be appreciated that less than all of the M services applications having their QoS targets less than their respective preferred QoS may be selected.

Next, in step S56, a control parameter β is set to 1. Then, in step S58, the QoS targets of the applications in the selected group are increased according to the expression:

$$\beta \frac{1 - E - f_{max}}{1 - E} \times 100\%$$

As indicated in FIG. 3, in increasing the QoS targets in step S58, the QoS broker does not increase a QoS target above its respective preferred QoS.

In subsequent step S60, the QoS broker determines if a QoS violation (a network overload) exists. If so, then in step S62, the QoS targets are reset to levels prior to step S58 and the control parameter is reduced. For example, the control parameter may be reduced by 10% in step S62. After step S62, processing returns to step S58. If in step S60, no QoS violation exists, then processing returns to step S40.

It will be appreciated that the embodiment of FIG. 3 may employ thresholding based on the amount of under loading to more aggressively increase QoS targets. For example, if the under loading exceeds a threshold, then instead of the proportional increasing shown in steps S46 and S58, the applications may have their QoS targets increased to their respective preferred QoS values. Alternatively, a larger control parameter may by used when the under loading exceeds threshold. Similarly, thresholding of this type may be used to select, as the group (EMS services in step S42 and M services in step S54), less than all of the applications having a target QoS less than the respective preferred QoS.

While the dynamic change of QoS targets has been described with respect to two priority classes, it will be understood that the present invention is not limited to this number of priority classes or classifying applications in the manner of this example.

Also, in the event of an extra-large, 9/11-scale emergency, it is in the best interest of the nation to make use of all available wireless spectrum to support the emergency response network. As such, the method of the present invention may be used to incrementally claim portions of the commercial spectrum used by commercial networks. For example, the commercial applications may be considered a third priority class, lower in priority than M services, in such an emergency.

The exemplary embodiments of the present invention being thus described, it will be obvious that the same may be varied in many ways. Such variations are not to be regarded as a departure from the invention, and all such modifications as would be obvious to one skilled in the art are intended to be included within the present invention.

We claim:

1. A method of managing air interface resources in a wireless network of the kind in which subscriptions to different levels of service are available for different applications and at least a first and a second class of applications compete with each other for bandwidth resources allocated by an allocation algorithm, comprising:
receiving an indication that an overload has been detected;
in response to the received overload indication, reducing one or more QoS targets for at least one class of application being served by the wireless network, wherein each QoS target is a prescribed level of network performance to be experienced by a user if sufficient resources can be allocated; and
communicating the one or more reduced QoS targets, thereby to initiate a reallocation of dedicated air interface bandwidth resources between at least the first and second classes that brings the network performance closer to the level specified by the current QoS targets, including said reduced one or more targets.

2. The method of claim 1, wherein the reducing step reduces the quality of service target based on an amount of the detected overload.

3. The method of claim 1, wherein the reducing step reduces the quality of service target in proportion to an amount of the detected overload.

4. The method of claim 1, wherein the reducing step reduces the quality of service target if the detected overload is less than a first overload threshold.

5. The method of claim 1, wherein at least some applications have assigned QoS targets each of which must be at least a required quality of service value, and wherein the reducing step reduces the quality of service targets for a first group of applications to the pertinent required quality of service values if the detected overload is greater than a first threshold, and reduces the quality of service targets for a second group of applications based on an amount of the overload detected if the detected overload is less than the first threshold.

6. The method of claim 5, further comprising:

dropping a third group of applications if the detected overload is greater than a second overload threshold, the second overload threshold being greater than the first overload threshold; and wherein the reducing step reduces the quality of service targets for the first group of applications to the pertinent required quality of service values if the detected overload is greater than the first threshold and less than the second threshold.

7. The method of claim 1, comprising:

determining a performance metric for each application; and detecting overload based on the performance metrics.

8. The method of claim 7, wherein the determining of a performance metric for each application is based on at least one actual performance measurement and on a poor performance bound associated with the actual performance measurement.

9. The method of claim 1, wherein the reducing step is performed for applications in a lower priority class than at least some other applications.

10. The method of claim 9, wherein a higher priority class of application is associated with emergency response services and a lower priority class is associated with municipal services.

11. The method of claim 1, wherein the reducing step is performed for applications in a higher priority class after being performed for a lower priority class of applications.

12. The method of claim 1, further comprising:

increasing quality of service targets for a further class of applications if an under load is detected.

13. The method of claim 12, wherein the increasing step increases the quality of service targets by an amount based on an amount of under loading.

14. A method of managing air interface resources in a wireless network of the kind in which subscriptions to different levels of service are available for different applications and at least a first and a second class of applications compete with each other for bandwidth resources allocated by an allocation algorithm, comprising:

receiving an indication that an under load has been detected;

in response to the received under load indication, increasing one or more QoS targets for at least one application being served by the wireless network, wherein each QoS target is a prescribed level of network performance to be experienced by a user if sufficient resources can be allocated; and communicating the one or more increased QoS targets, thereby to initiate a reallocation of dedicated air interface bandwidth resources between at least the first and second classes that brings the network performance closer to the level specified by the current QoS targets, including said increased one or more targets.

\* \* \* \* \*